(12) United States Patent
Sun et al.

(10) Patent No.: US 7,657,073 B2
(45) Date of Patent: Feb. 2, 2010

(54) REGISTRATION SYSTEM AND METHOD FOR TRACKING LUNG NODULES IN MEDICAL IMAGES

(75) Inventors: Shaohua Sun, Jersey City, NJ (US); Sandy A. Napel, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 198 days.

(21) Appl. No.: 11/791,393

(22) PCT Filed: Oct. 5, 2005

(86) PCT No.: PCT/US2005/036418

§ 371 (c)(1),
(2), (4) Date: Dec. 3, 2007

(87) PCT Pub. No.: WO2006/057724

PCT Pub. Date: Jun. 1, 2006

(65) Prior Publication Data

US 2008/0212852 A1 Sep. 4, 2008

(51) Int. Cl.
*G06K 9/00* (2006.01)
(52) U.S. Cl. ...................... 382/128; 382/131
(58) Field of Classification Search ................ 382/128, 382/131, 132; 378/4; 600/410, 454
See application file for complete search history.

(56) References Cited

U.S. PATENT DOCUMENTS

| | | | |
|---|---|---|---|
| 6,324,240 B1 * | 11/2001 | Yan et al. | 378/4 |
| 6,424,732 B1 * | 7/2002 | Shiffman et al. | 382/131 |
| 6,503,202 B1 * | 1/2003 | Hossack et al. | 600/454 |
| 2004/0260170 A1 * | 12/2004 | Wood et al. | 600/410 |

OTHER PUBLICATIONS

Siarry et al "Enhanced Simulated annealing for Globally Minimizing Functions of Many-Continuous Variables" (1997) ACM Transactions on Mathematical Software vol. 23, No. 2 pp. 209-228.
Segars et al. "Modeling Respiratory Mechanics in the MCAT and Spline-Based MCAT Phantoms" (1999) Nuclear Science Symposium, vol. 2 pp. 985-989.
Mantawy et al. "An Innovative Simulated Annealing Approach to the Long-Term Hydro Scheduling Problem" (2001) Large Engineering Systems Conference pp. 79-85.

* cited by examiner

*Primary Examiner*—Duy M Dang
(74) *Attorney, Agent, or Firm*—Lumen Patent Firm

(57) ABSTRACT

A nodule registration system useful for tracking lung nodules in computed tomography (CT) scans is presented. The system registers a small sphere centered on a detected nodule in one scan with another scan under a rigid transformation assumption using a fast registration scheme. The registration scheme employs very fast simulated annealing (VFSA) with constraints to maximize a tunable cross-correlation (TCC) coefficient, enabling the system to register, with minimal registration error, all nodules within their maximum diameter. The system achieves an average registration time of 10 seconds or less on a 3.06 GHz computer programmed to implement the present invention.

6 Claims, 6 Drawing Sheets

REGISTRATION SYSTEM AND METHOD FOR TRACKING LUNG NODULES IN MEDICAL IMAGES

FIELD OF THE INVENTION

The present invention relates generally to the field of medical imaging. More particularly, the present invention relates to lung nodule registration in medical images such as Computed Tomography (CT) scans.

BACKGROUND

Lung cancer kills more Americans each year than colorectal, breast, and prostate cancers combined. Over 173,000 new cases of lung cancer will be diagnosed and over 160,000 will die from this disease in 2004. The successful early detection and effective treatment of lung cancer focuses on its identification when it is a small lung nodule. As a result, when lung cancer is suspected, imaging with chest radiography or Computed Tomography (CT) scanning is the first step toward making the diagnosis. The tracking of lung nodules in scans acquired at different times for the same patient is useful in the determination of malignancy.

Because of its superior contrast resolution and cross-sectional acquisition, which effectively eliminates super-imposition of structures, CT is a more sensitive technique for detection of lung cancer than chest radiography. Unfortunately, CT is not specific for the diagnosis of lung cancer. In fact, most lung nodules do not represent malignancy, but are a mixture of benign lesions that range from normal lymph nodes to post-infectious granulomas to scars.

Lung registration is a non-rigid registration problem and has been studied for a long time. Most algorithms suffer from the prohibitive computation and/or errors introduced by unpredictable distortions at differing levels of inspiration. Although nodule shape and composition may correlate with malignancy/benignity, the correlation is not perfect and, instead, the most reliable means of differentiating benign from malignant nodules is serial CT follow-up and assessment for growth. Thus, when one or more nodules are found in a CT scan, which, today, may consist of several hundred cross-sectional images, they must be matched with their counterparts in one or more prior scans—a process that is time consuming and error prone.

SUMMARY OF THE INVENTION

The present invention is a registration system and method for tracking structures of interest, e.g., lung nodules, in medical images such as CT scans. The system finds a corresponding nodule to a nodule detected in a prior or subsequent CT scan. It registers a small sphere centered on a detected nodule in one scan with another scan under a rigid transformation assumption using a fast registration scheme. The system is based on local rigid registration of voxel values, and is robust in the presence of nodules that grow, shrink, or change shape with time, as well as to differences in surrounding architecture caused by different levels of inspiration.

The registration scheme according to the invention has three main components: preprocessing, optimization, and a new error metric referred to as the Tunable Cross-Correlation (TCC) coefficient. In the preprocessing step, the lung is segmented into source and target volumes. Three-dimensional bounding boxes are then derived for both the left and the right lungs. From the bounding boxes, initial transformation parameters are calculated, which are then fed into the optimization step.

The fast optimization scheme includes three steps: determining possible regions for the target nodule; mapping the three-dimensional (3D) coordinates of the points in each region to a 1D index; and in the 1D index space finding the location that has the maximum TCC coefficient with a sphere containing the source nodule.

The Very Fast Simulated Annealing (VFSA) algorithm is a variation of SA. The VFSA uses a new trial generator and cooling schedule to accelerate the convergence. According to the invention, the negative of the Tunable Cross-Correlation (TCC) coefficient is used as the energy function for VFSA. The VFSA algorithm is augmented with a re-annealing schedule and an anti-local-maximum procedure. If the current configuration has remained constant for too long a time, the anti-local maximum procedure replaces the current configuration with any new configuration. This technique advantageously avoids the plateaus in the learning curve.

The inventive system can register all nodules within their maximum diameter in a fast and accurate manner. In some embodiments, the system achieves, with minimal registration error, an average registration time of 10 seconds or less on a 3.06 GHz computer programmed to implement the present invention.

BRIEF DESCRIPTION OF THE FIGURES

The present invention together with its objectives and advantages will be understood by reading the following description in conjunction with the drawings, in which.

DETAILED DESCRIPTION OF THE INVENTION

The present invention provides a fast registration system and method for tracking lung nodules in medical images such as CT scans. According to an aspect of the invention, the method has three main stages: preprocessing, optimization, and TCC coefficient error metric.

Preprocessing

In the preprocessing step, the lung is first segmented from the source and target volumes and then three-dimensional bounding boxes are derived for both of the left and right lungs. From the bounding boxes, initial transformation parameters are calculated which are then fed into the subsequent optimization step.

Lung Segmentation

Figure 1:
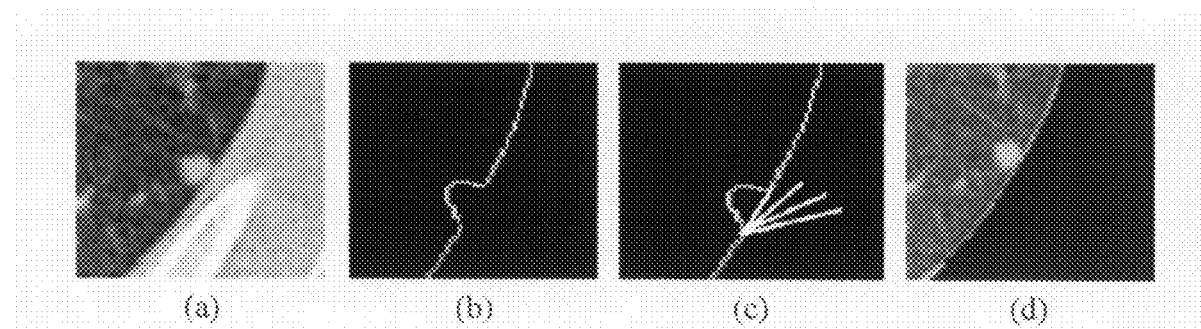
FIG. 1 shows segmentation steps and results after each processing step for an example nodule.

A segmentation algorithm was implemented that can retain juxtapleural nodules, i.e., nodules touching the chest wall. The segmentation method includes 3 main steps: initial segmentation, right and left lung extraction and separation, and edge smoothing. FIG. 1 shows the segmentation steps and the results after each processing step. FIG. 1(a) shows a portion of an original image, showing a juxtapleural nodule in the center.

In the first step, all pixels with intensities above a threshold and all air-intensity pixels outside the patient are deleted, thereby leaving only the lungs and other air-filled regions inside the patient.

In the second step, the lungs are longitudinally divided into superior (SP), central (CP), and inferior (IP) portions, which corresponds to the first two-ninths, the second two-ninths, and the last five-ninths of the whole volume respectively. The CP contains the trachea and bronchi, which are removed by deleting small regions with air density. The trachea are then tracked and removed from the most superior slice of the CP through the SP. In the IP, additional small regions of air density, representing air in other organs (stomach, bowel, etc.), are deleted.

In the third step, which is the key for retaining juxtapleural nodules, for each slice, connected region analysis is performed and the two largest regions are chosen, which are considered to be the left and right lungs. Each lung contour is then separated into a left and right segment, as shown in FIG. 1(b). A line segment test determines whether line segments drawn at a range of angles from points on the contour meet other points in the same segment. If they do, the line is included in the contour, thereby enclosing any juxtapleural nodules, as shown in FIG. 1(c). FIG. 1 (d) shows a portion of the segmented lung with the nodule included. By making the length of the line segments less than a given value, the size of the structures to be included can be controlled so as to maintain the shape of other "bumps" along the lung boundary, such as the heart.

Initial Registration Parameters from Bounding Boxes

After segmentation, bounding boxes for the left and right lungs are computed for both the source and target volumes. From these bounding boxes, the location of the corresponding nodule in the target volume can be estimated by equations:

$$x' = (x - X_{s2})/(X_{s2} - X_{s1}) * (X_{t2} - X_{t1}) + X_{t1}, \quad (1)$$

$$y' = (y - Y_{s1})/(Y_{s2} - Y_{s1}) * (Y_{t2} - Y_{t1}) + Y_{t1}, \quad (2)$$

$$z' = (z - Z_{s1})/(Z_{s2} - Z_{s1}) * (Z_{t2} - Z_{t1}) + Z_{t1}, \quad (3)$$

where $(x,y,z)$ is the coordinate of the source nodule, $(x',y',z')$ is the initial guess for the coordinate of the target nodule, $(X_1,Y_1,Z_1)$ and $(X_2,Y_2,Z_2)$ are the coordinates of the lower left front and upper right rear, respectively, of the bounding box, and subscripts s and t refer to the source volume and target volume, respectively. $(x',y',z')$ are fed into the optimization stage as the initial estimate for the location of the target nodule.

Optimization

The fast optimization scheme according to the present invention includes three steps: determining possible regions for the target nodule; mapping the 3D coordinates of the points in each region to a 1D index; and, in the 1D index space, finding the location that has the maximum TCC coefficient with a sphere containing the source nodule. In some embodiments, the radius of the sphere is calculated dynamically by growing from 9 mm until at least 25% of the points within the sphere are air-intensity points.

Search Range Determination

A search range for the target nodule location is determined in three steps. First, a liberal search range is established by considering all voxels within a 60×60×20 pixel cube centered at the initial estimate given by the bounding box method described above, using equations (1)-(3). Next, a filter bank selects possible regions from all the input voxels. Finally, the coordinates of all the points passing the filter bank are mapped into a 1D index, which defines the search space for the optimization algorithm.

Figure 2:
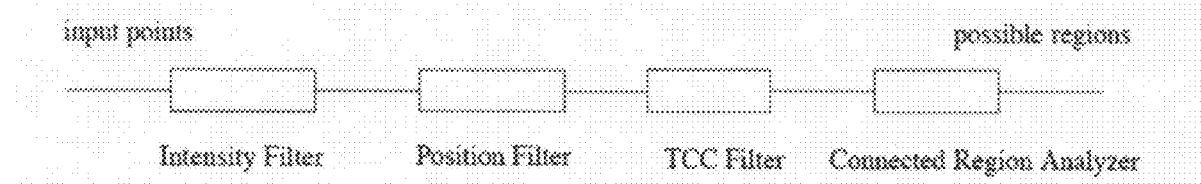
FIG. 2 shows a filtering process that, given an initial set of possible points, identifies possible regions for a target nodule.

The filter bank includes three series connected filters followed by a clustering stage, as illustrated in FIG. 2. The first filter (Intensity Filter) passes all the points satisfying an intensity constraint. The second filter (Position Filter) passes all the points satisfying a position constraint. The third filter is a TCC coefficient based filter, which passes a specified number of points by ranking the TCC coefficient of the surrounding voxels with the source sphere. The clustering stage is a connected region analyzer which groups connected points into a region. The output regions are fed into the coordinate mapping step.

The intensity constraint for the first filter is an intensity range, $$a_1 < v/u < a_2, \quad (4)$$

where u denotes the intensity of the center location of the source nodule, v denotes the intensity of a point input to the filter, and $a_1$ and $a_2$ are thresholds. Any point whose intensity falls in the range will pass the filter and any point whose intensity falls outside the range will not pass the filter. In some embodiments, $a_1$ is set to 0.5 and $a_2$ is set to 2. That is, only points that are between half as bright and twice as bright as the intensity of the center of the source nodule are retained, thereby removing low density lung parenchyma and any calcific foci.

Figure 3:
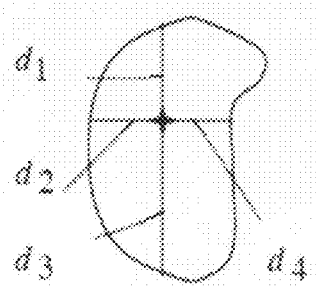
FIG. 3 shows four distances considered by a distance constraint.

The position constraint for the second filter is four distance constraints. As illustrated in FIG. 3, every point has four distances to the segmented lung boundary in the transverse view. Given these distances, the position constraint can be formulated as:

$$b_{1i} < \frac{d_{si}}{d_{ti}} < b_{2i} \quad \text{for all } i = 1,2,3,4, \quad (5)$$

were the subscript s denotes the distances for the center of the source nodule, the subscript t denotes the distances for the target position, and $b_{1i}$ and $b_{2i}$ are thresholds. In some embodiments, thresholds $b_{1i}$ (i=1,2,3,4) are set to be ⅓ and $b_{2i}$ (i=1,2,3,4) are set to be 3. That is, only target points that have all four distances between one third and three times the corresponding distances for the center of the source nodule are retained.

The TCC constraint for the third filter is a TCC range, $$\frac{tcc}{tcc_{max}} > c, \quad (6)$$

where tcc is the TCC coefficient for each point, and $tcc_{max}$ is the maximum of the TCCs of all the input points, and c is a threshold. In some embodiments, c is set to be 0.8. That is, only points with TCC in the $80^{th}$ percentile of all of the points passing the first two stages are retained.

The final stage groups the remaining points using a 3D connected region analysis, which produces groups of connected points, each group constituting a 3D region. A coordinate mapping stage then creates a coordinate list for each group by ordering all the group's members in a way such that only one coordinate component is different for two neighbors in the list, thus neighbors in the 1D index space still correspond to neighbors in the 3D coordinate space. Then for every filtered point in a region, its 3D coordinates correspond to a 1D index in the list. Each region will be searched over its 1D index space by an optimization algorithm. The region with the largest TCC coefficient at convergence is the predicted location of the nodule in the target data.

Optimization of TCC Coefficient

Simulated Annealing (SA) was first proposed as a Monte Carlo method and it is now very popular for solving optimization problems. Annealing refers to the process of heating up a solid to a high temperature and then lowering the temperature step by step. At each step, one maintains the temperature for a long enough time to let the solid reach thermal equilibrium. When the temperature approaches zero, the solid is assumed to have the least energy configuration.

In simulated annealing, at a given temperature, the solid could have many configurations, which correspond to different spins of the electrons and to different energy levels. The probability of the occurrence of each configuration is given by the Boltzmann distribution: $p_{config} = A \cdot \exp(-E_{config}/kT)$, where $E_{config}$ is the energy of the given configuration, T is absolute temperature, k is a constant, and A is a normalization constant.

To simulate this, a random perturbation is applied to the current configuration $E_c$ to obtain a trial configuration, $E_t$. If $E_c > E_t$, the trial configuration replaces the current one with probability $p_{config} = A \cdot \exp((E_c - E_t)/kT)$.

After enough perturbations are applied, one can assume that the solid has achieved thermal equilibrium at the current temperature. The above process is then repeated at a lower T until T approaches zero. According to the invention, T is associated with the iteration number n by a cooling schedule $T(n) = T_0/(1 + \ln(1+n))$, where $T_0$ is the initial temperature. The Very Fast Simulated Annealing (VFSA) algorithm is a variation of SA. It uses a new trial generator and cooling schedule to accelerate the convergence. In some embodiments, the VFSA algorithm is augmented with a re-annealing schedule and an anti-local-maximum procedure. Suitable re-annealing schedules include those disclosed by A. H. Mantawy et al. in "An innovative simulated annealing approach to the long-term hydro scheduling problem," 2001, pp. 79-85, and by P. Siarry et al. in "Enhanced simulated annealing for globally minimizing functions of many continuous variables," *ACM Trans. on Mathematical Software*, vol. 23, pp. 209-228, 1997. The anti-local-maximum procedure replaces the current configuration with any new configuration if the current configuration has remained constant for too long a time. In this way, the plateaus in the learning curve can be avoided.

Tunable Cross-Correlation (TCC) Coefficient

The negative of the Tunable Cross-Correlation (TCC) coefficient is used as the energy function for VFSA. TCC is defined as:

$$TCC = \frac{\sum_{(i,j,k) \in S} (u(i,j,k) - q_1\bar{u})(v(i,j,k) - q_2\bar{v})}{\sqrt{\sum_{(i,j,k) \in S} (u(i,j,k) - q_1\bar{u})^2 \sum_{i,j,k} (v(i,j,k) - q_2\bar{v})^2}} \quad (7)$$

where $u(i, j, k)$ and $v(i, j, k)$ denote the intensity of the points in source volume and target volume respectively, $\bar{u}$ is the mean of $u(i, j, k)$, $\bar{v}$ is the mean of $v(i, j, k)$, S is the volume over which TCC is calculated, and $q_1$, $q_2$ are two real numbers. By using $q_1$ and $q_2$, one can change the gradient around the maximum, which can lead to a more accurate registration result.

At temperature $T_n$, when $TCC_{new}$ is smaller than $TCC_{old}$, $TCC_{new}$ is accepted according to a probability $\exp((TCC_{new} - TCC_{old})/kT_n)$. If TCC as a function of shift is very sharp around a local maximum, $\exp((TCC_{new} - TCC_{old})/kT_n)$ is small, which means that the possibility of getting out of a local maximum is small. Similarly, if TCC as a function of shift is very flat around a maximum, $\exp((TCC_{new} - TCC_{old})/kT_n)$ is very close to 1. In this case, it is more like a random search, and the n accuracy can not be guaranteed unless the temperature is very close to zero. Thus, we can improve accuracy at a specific temperature by controlling the gradient of the TCC change with respect to shift.

The gradient of TCC with respect to shift can be changed by tuning $q_1$ and $q_2$. To exemplify this, let both u and v be 1-D functions and take the same form of a polynomial function: $1 - t^2$. When one shifts v(t) by l, one can get the function TCC(l). The gradient of TCC(l), TCC'(l), shows how TCC changes with respect to shift l.

Figure 4:
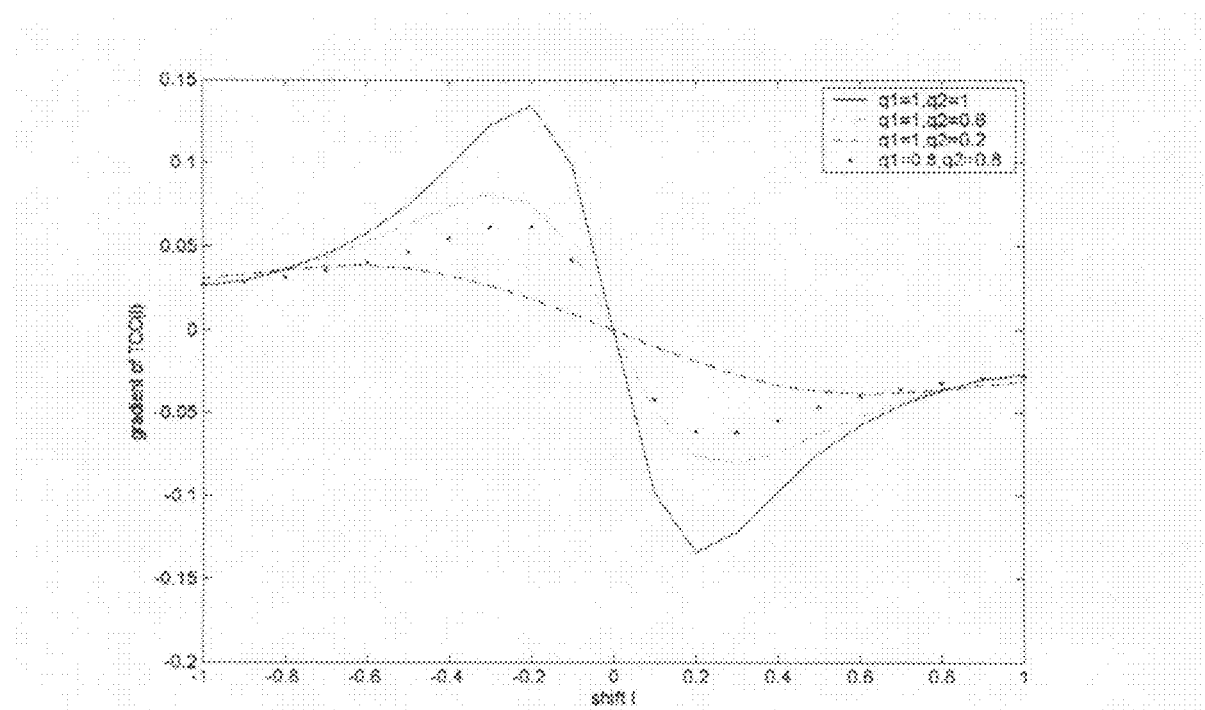
FIG. 4 plots a gradient of TCC as a function of shift for different values of $q_1$ and $q_2$.
Figure 5:
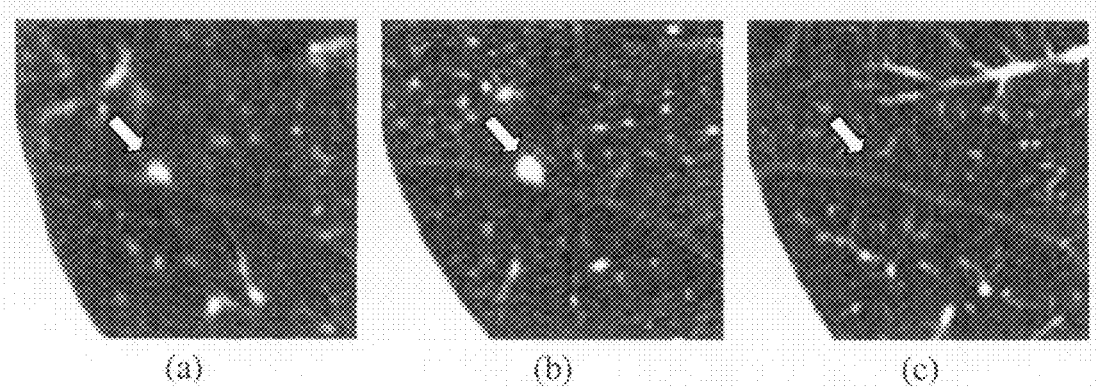
FIG. 5 exemplifies accuracy improvement enabled by TCC.

As illustrated in FIG. 4, by comparing TCC'(l) when $q_1$ and $q_2$ take different values, one can see that around l=0, when $q_1 = q_2 = 1$, TCC(l) changes most rapidly. When $q_1$ and $q_2$ take other values, the change of TCC(l) with respect to shift l is lessened. As discussed above, VFSA has a better chance of getting out of local maxima of TCC when the gradient of TCC with respect to shift is relatively low. Through the use of non-unity values of $q_1$ and $q_2$, local maxima can be avoided, thereby improving accuracy. This is further exemplified in FIG. 5 in which (a) shows a source nodule, (b) shows the correct target with $q_1 = 1$ and $q_2 = 0.1$, and (c) shows a target found at local maximum with $q_1 = 1$ and $q_2 = 1$.

EXPERIMENTS

We tested our method with two experiments: first, registration with a target volume derived from a source volume using a known transform and, second, using pairs of actual patient scans.

Registration error was evaluated in two ways. First, we evaluated the error as the absolute distance between the registered location and the true location, that is, $$e_1 = \|((i_r, j_r, k_r) - (i_g, j_g, k_g))\|, \quad (8)$$

where $(i_r, j_r, k_r)$ denotes the identified coordinate of the registered nodule, $(i_g, j_g, k_g)$ denotes the identified coordinate of the true location of the nodule, and $\|\cdot\|$ denotes the Euclidian distance in mm. Second, we evaluated the error as the ratio of the distance defined in (8) to the nodule radius, that is, $$\varepsilon_2 = \frac{\|(i_r, j_r, k_r) - (i_g, j_g, k_g)\|}{r(i, j, k)}, \quad (9)$$

where r(i, j, k) denotes the nodule radius, which is estimated by the half diagonal length of the nodule bounding box. Errors of less than one indicate a high likelihood that the target point is actually contiguous with the true nodule. We used this metric in recognition of the fact that neither the algorithm nor a human observer will consistently indicate a fixed point (e.g., the "center") within a nodule and, thus, the fact that larger nodules may result in larger absolute errors is not significant.

Experiment 1

Registration for a Known Non-Affine Transformation

Dataset

In this experiment, we simulated a second patient scan from a first by transforming the first scan using a non-affine transformation. This scan was acquired using multidetector helical CT and reconstructed with a voxel size of 0.6 mm*0.6 mm*1.25 mm. Because we know the transform beforehand, the true location $(i_g, j_g, k_g)$ in equation (8) for each nodule can be calculated using the known transform.

Simulated Non-Affine Transformation

In constructing the transformation, we sought to model distortion due to different inspiration points and cardiac pulsation. The non-affine transformation applied consists of a displacement vector field plus a global affine transformation. For an arbitrary point, the transformed coordinate can be calculated through:

$$(i_t, j_t, k_t) = T((i, j, k) + \vec{v}(i, j, k)), \quad (10)$$

where (i, j, k) denotes the original coordinate, $(i_t, j_t, k_t)$ denotes the transformed coordinate, $\vec{v}$ (i, j, k) denotes the local displacement vector applied to (i, j, k), and T(•) denotes the global affine transformation. The global affine transformation was modeled by a translation of 5 pixels in x, y, and z directions, and a rotation of 3 degrees in x, y, and z directions.

We computed the displacement vector $\vec{v}$ (i, j, k) as the sum of displacement vectors:

$$\vec{v}(i,j,k) = \vec{l}(i,j,k) + \vec{h}(i,j,k), \quad (11)$$

where $\vec{l}$ (i, j, k) denotes the displacement vector caused by lung respiration movement, and $\vec{h}$ (i, j, k) denotes the displacement vector caused by cardiac pulsation.

To model an altered inspiration point, $\vec{l}$ (i, j, k) is calculated using a magnification model. Suitable magnification models include those disclosed by G. J. Gibson et al. in "Exponential description of the static pressure-volume curve of normal and diseased lungs," *Am. Rev. Respir. Dis.*, vol. 120, pp. 799-811, October 1979; by Rideout in *Mathematical and Computer Modeling of Physiological Systems*, New Jersey: Prentice Hall, 1991; and by W. P. Segars et al. in "Modeling Respiratory Mechanics in the MCAT and Spline-based MCAT Phantoms," *Nuclear Science, IEEE Transactions on*, vol. 48, pp. 89-97, 2001.

In one embodiment, we adopted a model suggested by Segars, who modeled the lung volume change during breathing by adjusting the parameters of ribs and diaphragms. The change of long axis and short axis of ribs, and the height of diaphragms are approximated by sinusoidal functions. Based on these three functions, we can calculate magnification factors in x, y, and z directions at different time points in a respiration circle. Because patients are generally instructed to inhale and hold their breath during scanning, we picked a time point where the changes of the rib short axis, rib long axis, and the diaphragm height are relatively small, i.e., 0.8 cm, 0.4 cm, and 0.2 cm, respectively. This corresponded to magnification in x, y, z of 0.97, 0.98, and 0.99, respectively.

Figure 6:
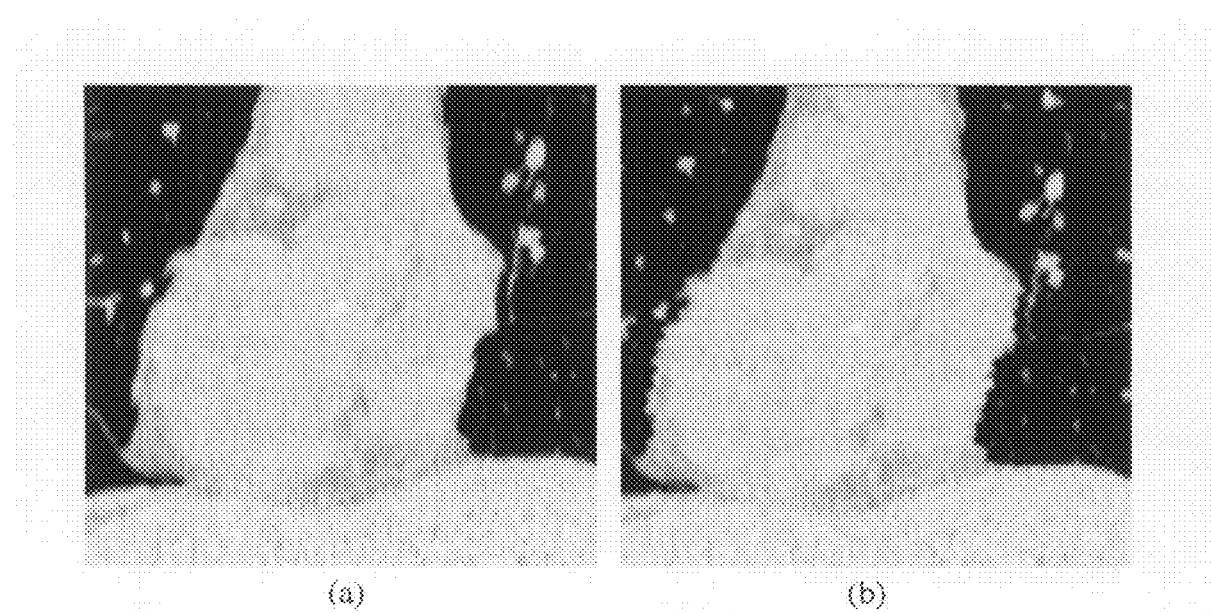
FIG. 6 shows, via a coronal section of an original slice and a transformed slice, an effect of cardiac pulsations in lungs near the heart.

As opposed to lung inspiration, where we assumed no change during the entire CT scan, cardiac pulsation causes time-varying distortions during the CT volume acquisition that are most evident near the epicardical borders. To model cardiac pulsation, $\vec{h}$ (i, j, k) was modeled by a sinusoidal function. The amplitude of the sinusoidal function was set to be 1.5 pixels around the heart and to decrease exponentially with the distance to heart in other area. The wavelength of the sinusoidal function was set to be 3.7 pixels, which corresponds to 44 beats during the 33-second acquisition, or a heart rate of 80 beats/minute. FIG. 6 shows photographs of a coronal slice of the volume before (a) and after (b) transformation, showing effect of cardiac pulsations in the lungs near the heart.

Generation of Test Data

A dataset of 57 points was used to test the registration scheme. The 57 points were uniformly sampled from the left and right lungs. Spacings of the samples in x, y, and z directions were 78 pixels, 50 pixels, and 14 slices, respectively. Altogether 10 slices were sampled and the average number of points per slice was 5.7.

Figure 7:
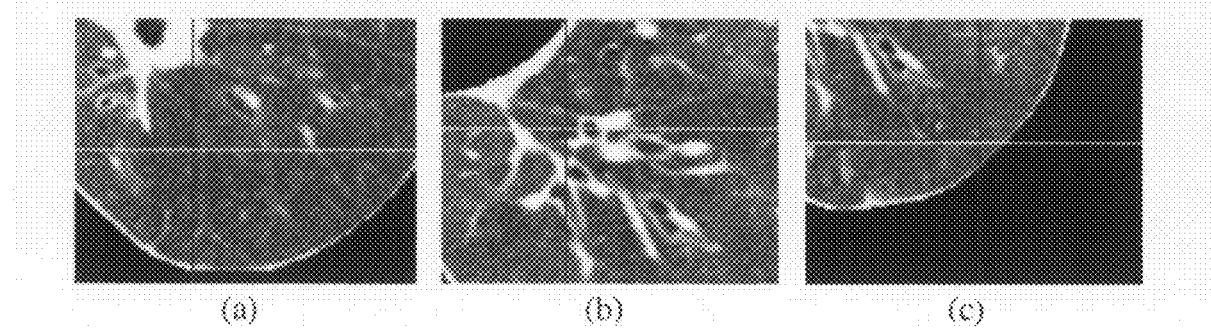
FIG. 7 are photographs exemplifying three categories of sampled points.

All of the samples can be divided into three categories, as illustrated in FIG. 7, where the cross indicates the sampled point: (a) "black" point, (b) point close to pulmonary structures, and (c) point close to chest wall. "Black" point means there is little anatomical structure around it. A "black" point can also be a point close to the chest wall. For our dataset, of the 57 points, 29 points were "black", 28 points were close to anatomical structures, and 18 points were close to the chest wall.

Results

Figure 8:
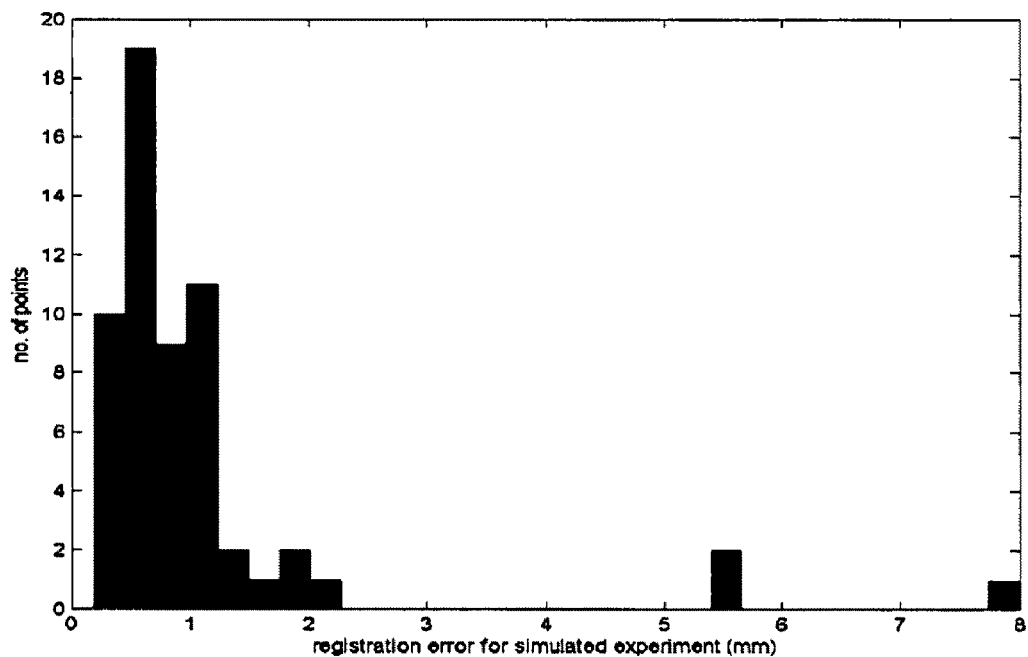
FIG. 8 is a histogram of registration error for simulated non-affine transformation.

Experimental results show that, for all the 57 sampled points, the mean absolute error was 1.1 mm±1.3 mm (s.d.) using equation (8). FIG. 8 is a histogram of registration errors for simulated non-affine transformation. FIG. 8 reveals that most points were registered with an error less than 3 mm. Of the three outliers whose registration errors were greater than 5 mm, they all belong to the category of "black" samples.

Experiment 2

Registration for Real Patient Data

Dataset

In this experiment, we used 12 pairs of patient scans, and evaluated registration error with both equations (8) and (9). Two radiologists, each with over 10 years experience with pulmonary CT, determined the true locations of the target nodules and matched them. (One found and matched nodules in 5 pairs of scans and the other found and matched nodules in 7 pairs of scans) Altogether, the radiologists detected 93 nodule pairs in the 12 pairs of scans.

Results

Figure 9:
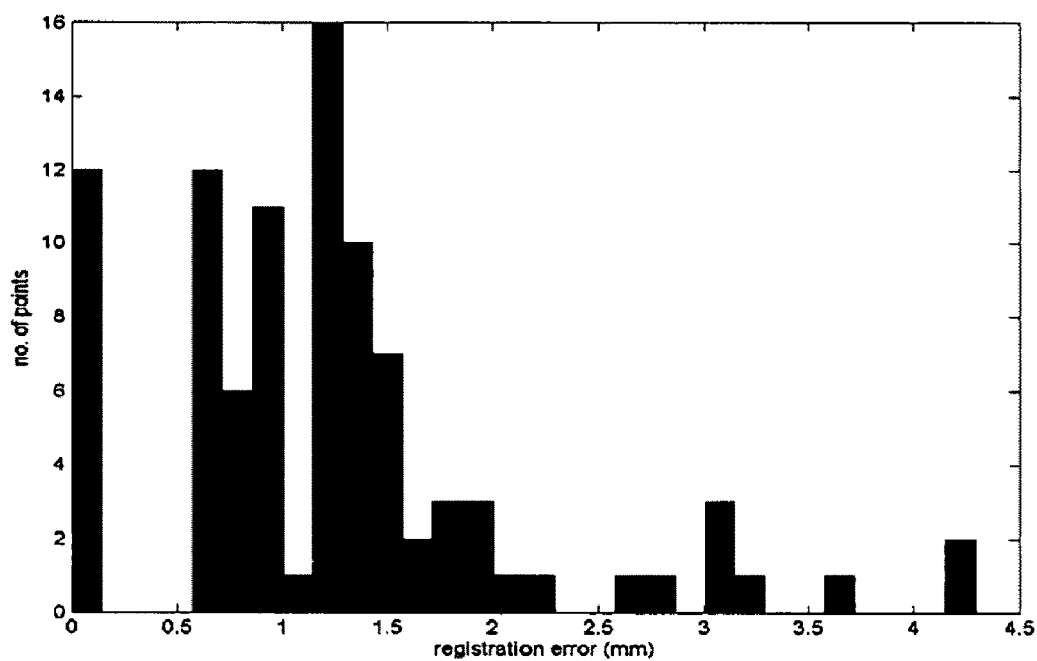
FIG. 9 is a histogram of registration error for real patient data evaluated by equation (8).
Figure 10:
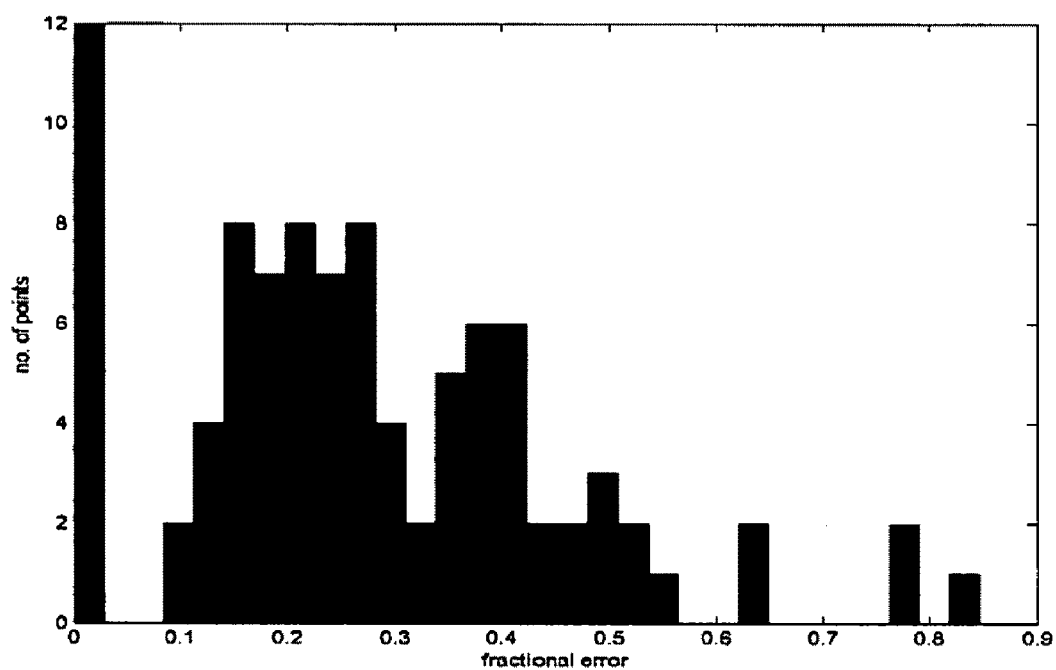
FIG. 10 is a histogram of registration error for real patient data evaluated by equation (9).
Figure 11:
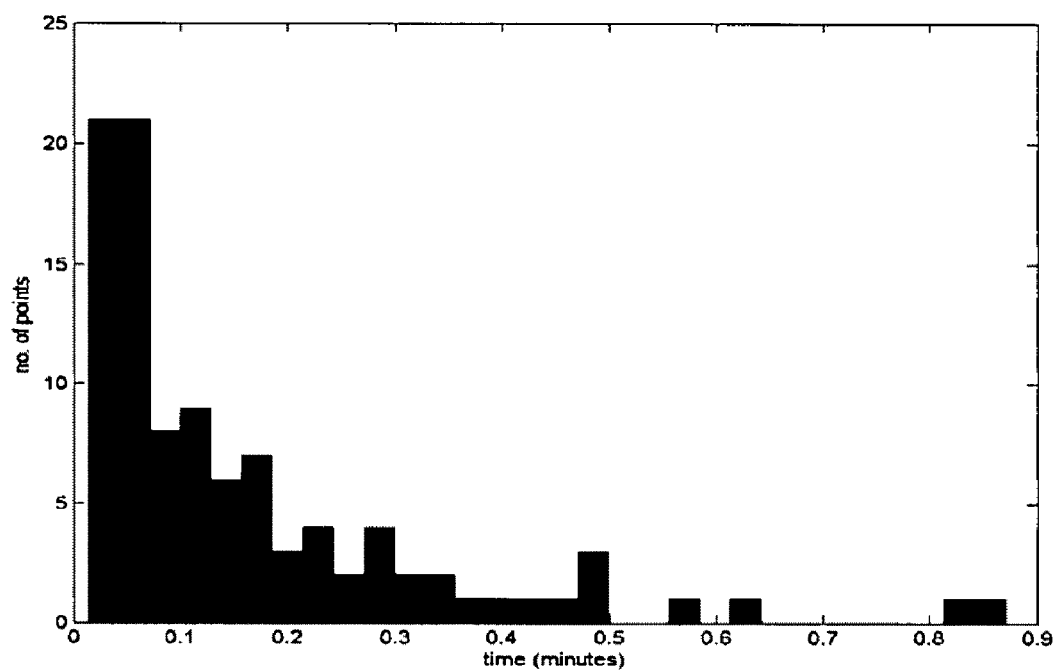
FIG. 11 is a histogram of registration time for real patient data.

For all the 93 nodules, the registration error evaluated by equation (8) was 1.2 mm±0.88 mm (s.d.), with a worst case error of 4.3 mm; and the registration error evaluated by equation (9) was 0.27±0.18 (s.d.), with a worst case error of 0.85. The mean absolute error in longitudinal (superior-inferior) coordinate was 0.62 mm±0.72 mm s.d, with a worst case of 3 mm. The average registration time per nodule was 0.16 min±0.17 min (s.d.), with a worst case of 0.87 minutes. FIGS. 9 and 10 are histograms of registration errors for real data experiment evaluated by equations (8) and (9), respectively. FIG. 11 is a histogram of registration times. From FIG. 10, we see that all registered nodule locations fall within the bounding box of the true matched nodules. From FIG. 11, we see that all of the nodules were registered within one minute, with 65 of the 93 (70%) nodules registered within 10 seconds.

Analysis

The experiments show that our registration system and method work well on both simulated non-affine transformation and real data. We chose to include the former results because the target locations are known without doubt, and the latter results to illustrate how the algorithm performs in a real clinical situation. Below we discuss how our method compares to other approaches for volume registration as well as issues that affect registration performance.

Relationship to Other Methods

Lung registration is a non-rigid registration problem due to the elastic deformation introduced by respiratory and cardiac motion. Since we are only aiming to find corresponding nodules, there is no need to register the whole lung. Instead, we register a small sphere centered at a detected nodule to transform the task to a rigid registration problem. Thus, the center of the registered target sphere points to the location of the nodule in the second dataset. The radius of the sphere is set to be small enough to allow the rigid transformation assumption while containing the whole nodule and some surrounding anatomy.

Many different registration methods have been proposed for different applications, which can be divided into two categories: feature-based methods and voxel property-based methods. For feature-based methods, the features based on points, edges, surfaces or volumes are extracted in a preprocessing step and then are transformed and matched. These methods depend on the reliability and stability of feature extraction. For voxel property based registration, there is no need to extract features prior to registration. Registration is done either through maximizing a similarity measure, which performs well for rigid or specifically affine transformation, or applying some kind of force to deform one volume into another. Similarity measures include the cross correlation coefficient, joint entropy, mutual information, and normalized mutual information. TCC is a variation of the cross correlation coefficient. Unlike other metrics mentioned above, however, TCC's properties around the maxima can be changed by tuning the two parameters, $q_1$ and $q_2$. This distinct feature makes it adaptive to different optimization algorithms.

Popular methods for optimization include gradient descent and conjugate gradient methods. However, they depend on the calculation of spatial gradients, which may be noisy and increase the possibility of being trapped in local optima during the optimization. Known force-deformation approaches include the viscous fluid flow model, the fast fluid registration, the "demons" algorithm, and the thin-plate spline method. Unfortunately, these methods require extensive computation, and so the applications are limited. Global optimization methods, such as the simulated annealing technique used here, are able to escape local optima, but suffer from a longer computation time. In contrast, the present invention establishes reasonable initial conditions, limits the search space and transforms it from six degrees of freedom to one, and advantageously reduces the computation required to near clinically acceptable levels.

Segmentation

Figure 12:
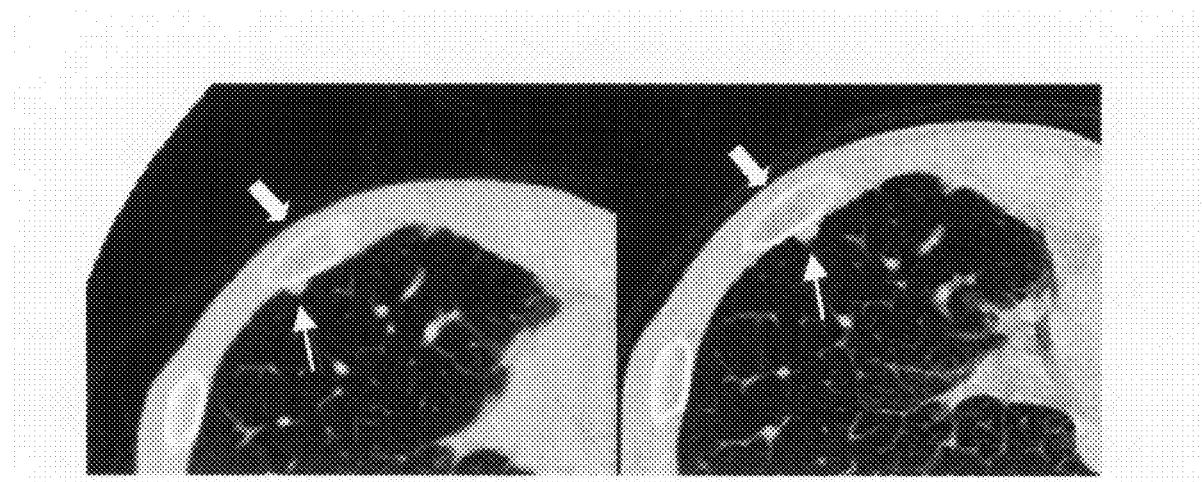
FIG. 12 is an example of relative position of nodule (arrow) and rib (broad arrow) at two different respiration points.

Segmentation is an important preprocessing step, not only for the delineation of the bounding boxes of the left and right lungs, but also for improving registration accuracy. Because the lung and ribs are not rigidly attached, the position of a nodule with respect to a rib can change with respiration. Thus, we must remove ribs to prevent them from impacting the registration of nodules near the chest wall. FIG. 12 shows an example of a nodule that is very close to a rib. We can see that the rib position changes in the two scans. The relative position of nodule (thin arrows) and rib (broad arrows) are shown at two different respiration points.

Initial Estimates from Bounding Boxes

Figure 13:
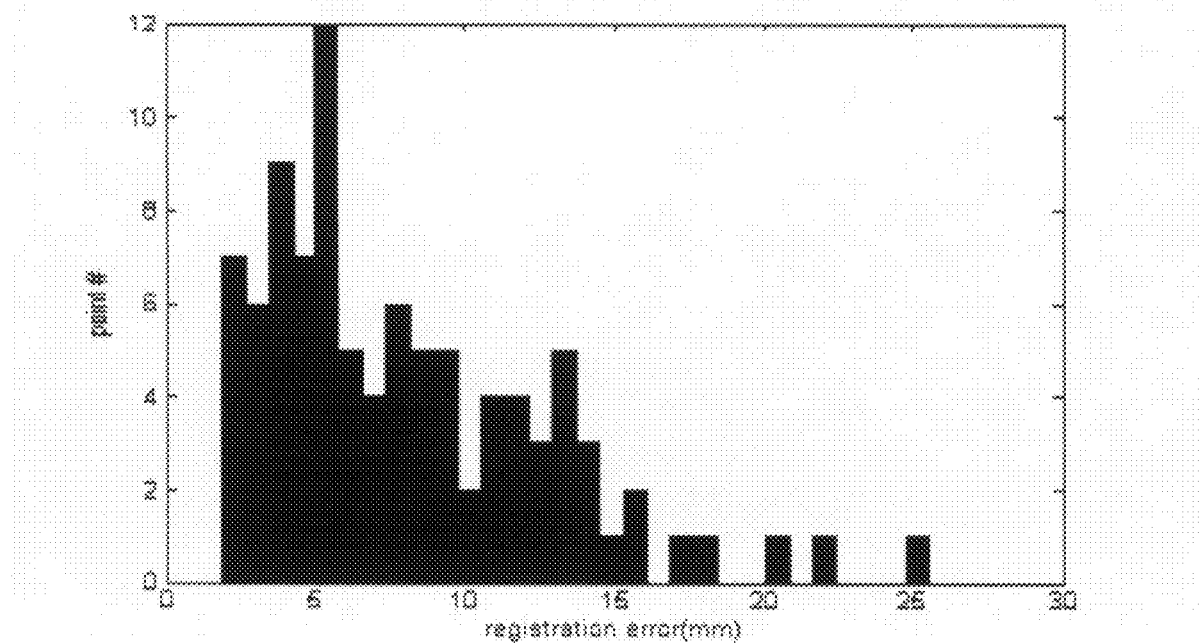
FIG. 13 is a histogram of initial error for real patient data.

Based on distances from the lung bounding boxes, our system also calculated the distance of the initial estimates from the true locations of target nodules for the experiment using 12 pairs of patient scans. FIG. 13 is a histogram of these distances, and shows that the initial error ranges from 2 mm to 25 mm. While some nodules are registered quite accurately based on simple scaling rules, many are not. By comparing FIG. 13 with FIG. 9, we see that, utilizing the VFSA algorithm, the system reduces the errors substantially.

Series Connected Filters

We used the bank of series connected filters to narrow down search space for the VFSA algorithm. The average percent volume reduction from 72,000 voxels in the initial cube surrounding the initial estimate was 99%. Stage by stage, the percent volume reduction was 93%, 1.6%, and 5.4%, for intensity-based filter, position-based filter, and TCC-based filter, respectively. The time required for the first two filters was short compared to the third filter, so the volume reduction after the first two filters, which is related to the position, intensity and size of the nodule, is a main cause of the difference in registration time for different nodules. Aside from the improvement in performance, the use of this filter bank did not affect registration accuracy.

Reduction of Degrees of Freedom

The local rigid body method disclosed herein optimizes only with respect to three translations, unlike other methods that also allow rotations. Although expected slight changes in patient orientation can result in rotations of the anatomy surrounding a nodule, and optimizing with respect to these rotations could produce a higher TCC, the fact that the system registers only a small subvolume reduces the potential effect of these rotations to insignificant levels. The performance advantage due to reducing the number of degrees of freedom is substantial and allows us to reach levels that approach clinical acceptability.

CONCLUSIONS

We have presented a fast registration method that can be used for matching nodules in a series of CT scans. This local rigid-body registration uses a novel Tunable Cross-Correlation error metric and a Very Fast Simulated Annealing optimizer. Experimental results show that the registration system implementing the inventive method is both accurate and fast. By facilitating efficient and accurate tracking of pulmonary nodules over time, this type of system is particularly advantageous in aiding the detection of early lung cancer.

We implemented our automated registration system in C++ on a 3.06 GHz computer with 2 GB RAM. In this implementation, about half the time of the computation is spent on trilinear interpolation. Using graphic card programming, the overall time can be further cut down by at least half, which is almost instant for most nodules.

As one skilled in the art will appreciate, any digital computer systems can be configured or otherwise programmed to implement the method and system disclosed herein, and to the extent that a particular digital computer system is configured to implement the system and method disclosed herein, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Although the present invention and its advantages have been described in detail, it should be understood that drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As one of ordinary skill in the art will appreciate, the present invention can be implemented, modified, or otherwise altered without departing from the principles and spirit of the present invention. Therefore, the scope of the present invention should be determined by the following claims and their legal equivalents.

What is claimed is:

1. A computer-readable medium storing a computer program implementing method steps for registering nodules in medical images, said method steps comprising:
    a) preprocessing said medical images, comprising:
        segmenting structures of interest into source and target volumes;
        deriving three-dimensional (3D) bounding boxes from said volumes; and
        estimating a location of a target nodule from said bounding boxes;
    b) optimizing said location, comprising:
        determining possible regions for said target nodule;
        mapping 3D coordinates of points in each region to a 1D index; and
        in the 1D index space, finding an optimized location that has the maximum Tunable Cross-Correlation (TCC) coefficient with a sphere containing a source nodule; and
    c) optimizing said TCC coefficient, comprising:
        using the negative of the TCC coefficient as an energy function for a Very Fast Simulated Annealing (VFSA) algorithm;
        augmenting said VFSA algorithm with a re-annealing schedule and an anti-local-maximum procedure; and
        controlling gradient of TCC changes with respect to shift, thereby improving registration accuracy.

2. The computer-readable medium according to claim 1, wherein said TCC is defined as:

$$TCC = \frac{\sum_{(i,j,k) \in S} (u(i,j,k) - q_1\bar{u})(v(i,j,k) - q_2\bar{v})}{\sqrt{\sum_{(i,j,k) \in S} (u(i,j,k) - q_1\bar{u})^2 \sum_{i,j,k} (v(i,j,k) - q_2\bar{v})^2}}$$

where u(i,j,k) and v(i,j,k) denote the intensity of points in said source volume and said target volume, respectively, $\bar{u}$ is the mean of u(i,j,k), $\bar{v}$ is the mean of v(i,j,k), S is the volume over which said TCC is calculated, and $q_1$, $q_2$ are two real numbers.

3. The computer-readable medium according to claim 1, wherein said medical images are computed tomography (CT) scans.

4. A computer system programmed to perform method steps, wherein said method steps comprising
    a) preprocessing said medical images, comprising:
        segmenting structures of interest into source and target volumes;
        deriving three-dimensional (3D) bounding boxes from said volumes; and
        estimating a location of a target nodule from said bounding boxes;
    b) optimizing said location, comprising:
        determining possible regions for said target nodule;
        mapping 3D coordinates of points in each region to a 1D index; and
        in the 1D index space, finding an optimized location that has the maximum Tunable Cross-Correlation (TCC) coefficient with a sphere containing a source nodule; and
    c) optimizing said TCC coefficient, comprising:
        using the negative of the TCC coefficient as an energy function for a Very Fast Simulated Annealing (VFSA) algorithm;
        augmenting said VFSA algorithm with a re-annealing schedule and an anti-local-maximum procedure; and
        controlling gradient of TCC changes with respect to shift, thereby improving registration accuracy.

5. The computer system according to claim 4, wherein said TCC is defined as:

$$TCC = \frac{\sum_{(i,j,k)\in S}(u(i,j,k)-q_1\bar{u})(v(i,j,k)-q_2\bar{v})}{\sqrt{\sum_{(i,j,k)\in S}(u(i,j,k)-q_1\bar{u})^2 \sum_{i,j,k}(v(i,j,k)-q_2\bar{v})^2}}$$

where u(i,j,k) and v(i,j,k) denote the intensity of points in said source volume and said target volume, respectively, $\bar{u}$ is the mean of u(i,j,k), $\bar{v}$ is the mean of v(i,j,k), S is the volume over which said TCC is calculated, and $q_1$, $q_2$ are two real numbers.

6. The computer system according to claim 4, wherein said medical images are computed tomography (CT) scans.

\* \* \* \* \*